Patented June 24, 1930

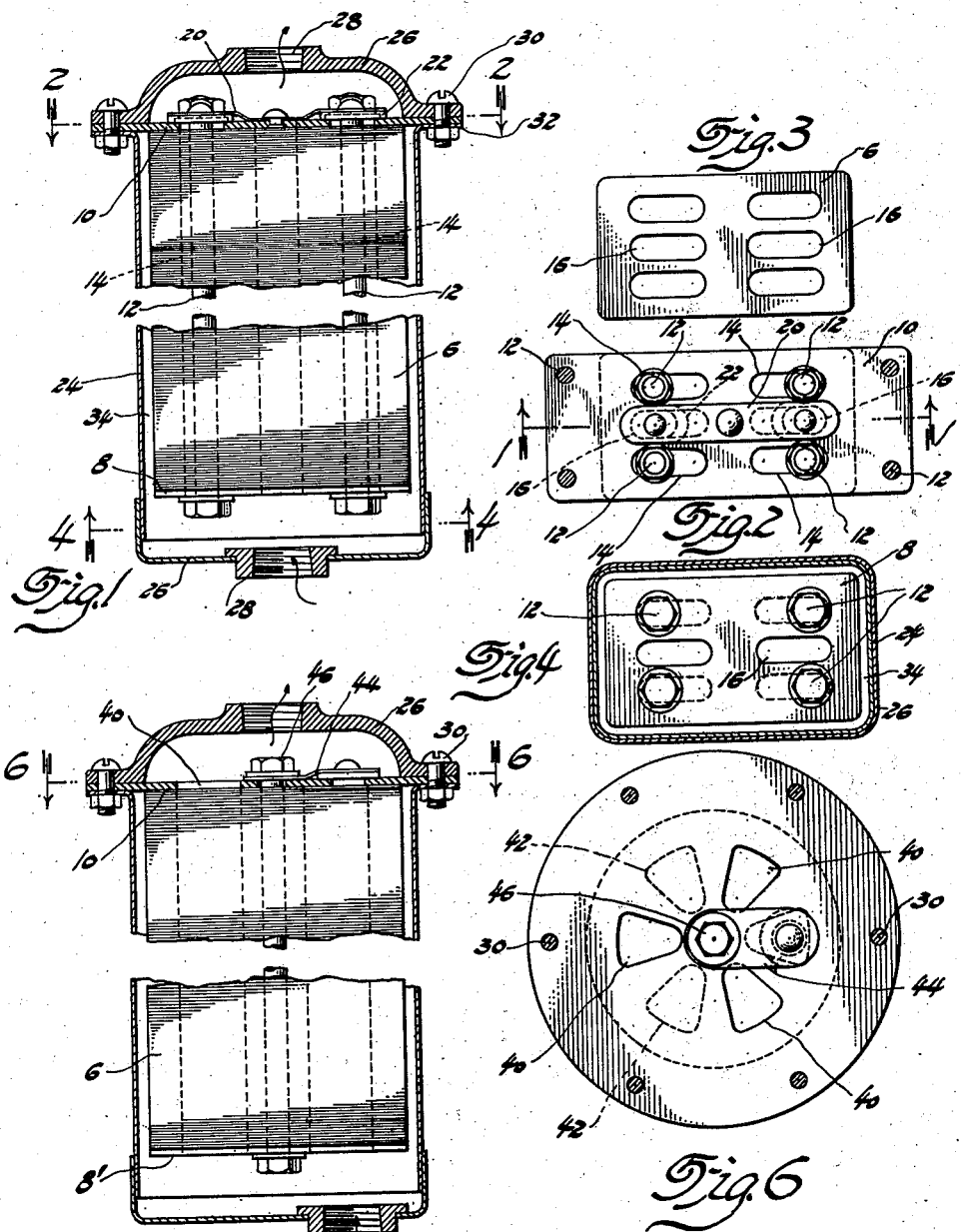

1,768,350

UNITED STATES PATENT OFFICE

THERON P. CHASE, OF DETROIT, MICHIGAN, ASSIGNOR TO GENERAL MOTORS RESEARCH CORPORATION, OF DETROIT, MICHIGAN, A CORPORATION OF DELAWARE

OIL FILTER

Application filed December 24, 1926. Serial No. 156,974.

This invention is an improvement on a type of filter disclosed and claimed in the application of C. R. Short, Ser. No. 125,451, filed July 28th, 1926. In this design of filter the fluid is forced between sheets of paper or other fibrous material in contrast to the usual methods of filtration in which the fluid is passed through sheets or layers of filtering medium.

It is the object of my invention to provide a filter of this general type in which a greatly increased filtering surface is afforded. I have accomplished this by providing a plurality of passages in parallel in the body of the filter through which fluid is supplied to the filtering medium and similar passages in parallel through which filtered oil is discharged from the filtering medium.

I have also embodied in my improved filter a pressure operated by-pass characterized by the feature that when the filter becomes clogged an unobstructed passage is provided through rather than around the filter.

In the drawings:

Fig. 1 is a section through my improved filter but with the filter body shown in elevation;

Fig. 2 is a view taken approximately on line 2—2 of Fig. 1;

Fig. 3 is a plan view of one of the sheets of filtering material;

Fig. 4 is a section taken on line 4—4 of Fig. 1, looking in the direction of the arrows;

Fig. 5 is a view similar to Fig. 1 showing a modification;

Fig. 6 is a view taken approximately on line 6—6 of Fig. 5.

The form shown in Figs. 1 to 4 will first be described. The filter body consists of a stack of sheets 6, such as shown in Fig. 3, clamped between bottom plate 8 and top plate 10 by means of bolts 12 passing through alined apertures provided in the sheets and plates as shown on the drawing. It will be noted that the apertures provided in the filter sheets and in the top plate are larger than is necessary to accommodate the clamping bolts while the apertures provided in the bottom plate are merely of sufficient size to receive the bolts. By this arrangement, four passages 14 are provided closed at the bottom by the plate 8 and open at the top around the bolts 12. The plates 8 and 10 and the sheets are likewise provided with alined passages 16 closed at the top by means of spring pressed flap valves of any suitable construction. The valves herein disclosed consist of a leaf spring 20 centrally secured to the upper side of plate 10 and carrying pads 22 of felt or the like in sealing engagement with the top of the plate.

The filter body thus described fits within receptacle 24 provided with bottom closure 26 having a port 28 through which fluid may be supplied. The upper end of the casing is closed by means of a cover 26 provided with a port 28 for the discharge of the filtered fluid. The parts of the casing are conveniently secured together by bolts 30 passing through alined apertures in the cover 26, the plate 10 and the flange 32 provided at the top of the case 24. It will be noted that the filter body fits within the receptacle 24 in spaced relation to the walls thereof providing an annular channel 34 to permit the fluid to have access to the filter body.

The filter operates as follows:

Oil or other fluid supplied to the filter through port 28 surrounds the filter and at the same time fills the passages 16 and thence works its way through the filtering medium by passing between the layers of paper or other fibrous material of which it is composed, finding egress through passages 14 into the upper portion of the case and thence outwardly through port 28.

Where the filter is used in an automobile engine lubricating system, it is desirable that should the filter become clogged the circulation of oil will not stop. With this apparatus the clogging of the filter permits the pressure to build up to a point where the tension of the spring 20 is overcome and the oil thereafter discharges directly through the passages 16 into the upper compartment.

In Figs. 5 and 6, I have shown a slightly modified construction in which three passages numbered 40 are provided, opening into the upper chamber afforded by the cap 26 and closed at the bottom by means of plate 8'. I have also provided three passages numbered 42, all of which are open at their lower ends and two of which are closed at their upper ends by means of plate 10 while the third is closed by means of spring-pressed valve 44 mounted in this case on a centrally located bolt 46 which serves to clamp top plate, filter sheets and bottom plate together in assembled relation. It is obvious that in this form of the invention the filter sheets are of circular form, each sheet being provided with six radially grouped perforations 40, 42, as indicated on Fig. 6.

While my filter has been especially designed for service in connection with lubricating systems of automobile engines, it is obvious that it is of general utility for the filtering of fluids.

It is especially adapted for automobile use in that the filter body is readily removable and is composed of cheap materials making it practicable for the lowest priced cars to be equipped with an oil filter.

I claim:

1. A filter unit comprising a filter body comprising a stack of sheets of fibrous material, a casing for said body divided into two compartments, said body fitting in spaced relation in the casing to provide an annular passage thereabout in one of said compartments, said body having a plurality of longitudinally extending passages communicating with the other of said compartments, the fluid in travelling from one compartment to the other passing through said body in a direction substantially transverse to its axis.

2. The combination of a filter body, a longitudinal passage through said body, through which fluid is supplied to the filter, a passage for receiving filtered fluid, the fluid in passing through the filter from one passage to the other following a direction substantially transverse to the axis of the body, and a normally closed pressure relief valve at one end of said longitudinal passage adapted to be opened to permit an unobstructed flow of oil through the filter when the oil pressure becomes excessive as a result of clogging of the filter.

3. In a fluid filter comprising a container, a filtering medium in said container, a plurality of passages in said medium, some of said passages permitting ingress and others permitting egress of the fluid, and inlet and outlet ports for said container, all of said passages extending in the same general direction and closed at one end, the closure for one set of passages forming a by-pass valve to permit the passage of fluid when the filter is not functioning.

4. In a fluid filter comprising a container, a cap for said container, a member secured between said cap and container, a filtering medium suspended from said member, a plurality of passages in said medium to permit the flow of fluid, inlet and outlet ports to said container, and a bolt passing through said filtering medium and forming the means for securing said filtering medium to said member.

5. The invention of claim 4, some of said passages having a by-pass interrelated therewith to permit the flow of fluid when the filter is not functioning.

6. The invention of claim 4, some of said passages having a resilient member placed thereover forming a by-pass to permit the flow of fluid when the filter is not functioning, said resilient member having pads attached thereto which pads cover the openings at the ends of the passages.

7. In a fluid filter comprising a container, a cap for said container, a member secured between said cap and container, a filtering medium suspended from said member, a plurality of passages in said medium to permit the flow of fluid, and inlet and outlet ports to said container, some of said passages having a by-pass interrelated therewith to permit the flow of fluid when the filter is not functioning.

8. In a fluid filter comprising a container, a cap for said container, a member secured between said cap and container, a filtering medium suspended from said member, a plurality of passages in said medium to permit the flow of fluid, inlet and outlet ports to said container, a resilient member placed over some of said passages forming a by-pass to permit the flow of fluid when the filter is not functioning, and pads attached to said resilient member and covering the openings at the ends of the passages.

In testimony whereof I affix my signature.

THERON P. CHASE.